(12) United States Patent
Thomas et al.

(10) Patent No.: US 8,896,207 B2
(45) Date of Patent: Nov. 25, 2014

(54) FLUORESCENT LIGHT FIXTURE ASSEMBLY WITH LED LIGHTING ELEMENT AND CONVERTER MODULES

(75) Inventors: James Thomas, Tierra Verde, FL (US); Gary Gatesman, Indian Rocks Beach, FL (US); James Mosier, St. Petersburg, FL (US)

(73) Assignee: ElectraLED Inc., Largo, FL (US)

( * ) Notice: Subject to any disclaimer, the term of this patent is extended or adjusted under 35 U.S.C. 154(b) by 568 days.

(21) Appl. No.: 12/950,897

(22) Filed: Nov. 19, 2010

(65) Prior Publication Data
US 2011/0121756 A1    May 26, 2011

Related U.S. Application Data

(60) Provisional application No. 61/281,585, filed on Nov. 19, 2009, provisional application No. 61/336,104, filed on Jan. 15, 2010.

(51) Int. Cl.
*H01J 7/44* (2006.01)
*H05B 33/08* (2006.01)

(52) U.S. Cl.
CPC ........... *H05B 33/0809* (2013.01); *Y02B 20/342* (2013.01); *Y02B 20/386* (2013.01)
USPC .......... 315/32; 315/200 R; 315/205; 315/206; 315/207; 315/209; 315/246; 315/291; 315/312; 315/185 S; 315/195; 315/185 R (58) Field of Classification Search
USPC ...... 315/185 S, 185 R, 195, 200 R, 205–207, 315/200 A, 220–226, 246, 247, 291, 312, 315/294, 32
See application file for complete search history.

(56) References Cited

U.S. PATENT DOCUMENTS

| | | | |
|---|---|---|---|
| 4,972,126 A | * | 11/1990 | Nilssen ......................... 315/324 |
| 5,463,280 A | | 10/1995 | Johnson |
| 5,688,042 A | | 11/1997 | Madadi et al. |
| 5,726,535 A | | 3/1998 | Yan |
| 6,283,612 B1 | | 9/2001 | Hunter |
| 6,325,651 B1 | | 12/2001 | Nishihara et al. |
| 6,331,915 B1 | | 12/2001 | Myers |

(Continued)

FOREIGN PATENT DOCUMENTS

| | | |
|---|---|---|
| EP | WO2009136322 A1 | 11/2009 |
| JP | 2004192833 A | 7/2004 |

(Continued)

*Primary Examiner* — Douglas W Owens
*Assistant Examiner* — Srinivas Sathiraju
(74) *Attorney, Agent, or Firm* — McDermott Will & Emery LLP (57) ABSTRACT

The present invention is directed to a fluorescent light fixture assembly including a ballast and a novel lighting element that includes an array of LEDs and at least one converter module that enables the existing ballast providing an AC power input to supply DC power to the LED array. The lighting element includes a body that contains the LED array and the converter modules and shares the configuration of the lighting element that is to be retrofitted. The lighting element receives power from the pre-existing ballast, wherein the converter module provides a constant current source to power the LED array. Thus, the lighting element, including the converter module, replaces the conventional fluorescent light tube in a cost-effective retrofit manner with the existing ballast.

22 Claims, 7 Drawing Sheets

(56) References Cited

U.S. PATENT DOCUMENTS

| | | | |
|---|---|---|---|
| 6,420,838 B1 * | 7/2002 | Shackle | 315/224 |
| 6,659,622 B2 | 12/2003 | Katogi et al. | |
| 6,682,205 B2 | 1/2004 | Lin | |
| 6,860,628 B2 | 3/2005 | Robertson et al. | |
| 6,936,968 B2 | 8/2005 | Cross et al. | |
| 7,049,761 B2 | 5/2006 | Timmermans et al. | |
| 7,114,830 B2 | 10/2006 | Robertson et al. | |
| 7,488,086 B2 | 2/2009 | Wu et al. | |
| 7,490,957 B2 | 2/2009 | Leong et al. | |
| 7,510,299 B2 | 3/2009 | Timmermans et al. | |
| 7,562,998 B1 | 7/2009 | Yen | |
| 7,712,918 B2 | 5/2010 | Siemiet et al. | |
| 7,928,664 B2 * | 4/2011 | Beland | 315/276 |
| 2003/0102810 A1 | 6/2003 | Cross et al. | |
| 2004/0012959 A1 | 1/2004 | Robertson et al. | |
| 2005/0029966 A1 * | 2/2005 | Buonocunto | 315/291 |
| 2005/0162093 A1 | 7/2005 | Timmermans et al. | |
| 2006/0193131 A1 | 8/2006 | McGrath et al. | |
| 2007/0053182 A1 | 3/2007 | Robertson | |
| 2007/0223225 A1 | 9/2007 | Eiich et al. | |
| 2007/0242466 A1 | 10/2007 | Wu et al. | |
| 2008/0151535 A1 | 6/2008 | de Castris | |
| 2008/0158870 A1 | 7/2008 | Sun et al. | |
| 2008/0253122 A1 | 10/2008 | Hancock et al. | |
| 2008/0290814 A1 | 11/2008 | Leong et al. | |
| 2009/0073693 A1 | 3/2009 | Nall et al. | |
| 2009/0091929 A1 | 4/2009 | Faubion | |
| 2009/0159919 A1 | 6/2009 | Simon et al. | |
| 2009/0161359 A1 | 6/2009 | Siemiet et al. | |
| 2009/0200950 A1 | 8/2009 | Jensen | |
| 2009/0219713 A1 | 9/2009 | Siemiet et al. | |
| 2009/0261706 A1 | 10/2009 | Sorella et al. | |
| 2009/0290334 A1 | 11/2009 | Ivey et al. | |
| 2009/0303720 A1 | 12/2009 | McGrath | |
| 2010/0008085 A1 | 1/2010 | Ivey et al. | |
| 2010/0014288 A1 | 1/2010 | Kreutzer et al. | |
| 2010/0027259 A1 | 2/2010 | Simon et al. | |
| 2010/0033095 A1 | 2/2010 | Sadwick | |
| 2010/0102729 A1 | 4/2010 | Katzir et al. | |
| 2010/0102730 A1 | 4/2010 | Simon et al. | |
| 2010/0207536 A1 * | 8/2010 | Burdalski et al. | 315/224 |

FOREIGN PATENT DOCUMENTS

| | | | | |
|---|---|---|---|---|
| JP | 11135274 A | | 5/2009 | |
| JP | 2009245790 A | | 10/2009 | |
| KR | 100884279 B1 | | 2/2009 | |
| KR | PCT/KR2009/002999 | * | 2/2009 | F21V 17/00 |
| KR | WO2009035203 A1 | | 3/2009 | |
| KR | WO2009064099 A2 | | 5/2009 | |
| WO | WO 2009055821 A1 | * | 4/2009 | H05B 33/08 |
| WO | WO2009055821 A1 | | 4/2009 | |
| WO | WO 2010050659 A1 | * | 5/2010 | H05B 33/08 |

* cited by examiner

FLUORESCENT LIGHT FIXTURE ASSEMBLY WITH LED LIGHTING ELEMENT AND CONVERTER MODULES

CROSS-REFERENCE TO RELATED APPLICATIONS

This application claims the benefit of U.S. Provisional Application No. 61/281,585 filed Nov. 19, 2009 and U.S. Provisional Application No. 61/336,104 filed Jan. 15, 2010.

FEDERALLY SPONSORED RESEARCH OR DEVELOPMENT

Not applicable.

TECHNICAL FIELD

The invention relates to a fluorescent light fixture assembly including a ballast and a lighting element that includes an array of LEDs and at least one converter module that enables the existing ballast to supply DC power to the LED array.

BACKGROUND OF THE INVENTION

Conventional fluorescent light fixtures can be found in a variety of commercial, residential and retail applications. These fixtures typically include a housing, an electronic ballast and at least one fluorescent light tube, which may be linear or curvilinear. The ballast is electrically connected to the power supply, is installed within the fixture housing, and limits the amount of current supplied to the light tube(s). In the United States, a typical ballast will be supplied with an AC voltage of approximately 120 VAC to 240 VAC. To provide appropriate starting and operating conditions, the ballast alters the frequency of the power supply from the standard mains (e.g., 60 Hz in the United States) to 20 kHz or higher, which essentially eliminates the flicker effect. Examples of conventional linear fluorescent fixtures include the T8 designation, which correlates to a tube diameter of 1 inch, the T9 designation, which correlates to a tube diameter of 1⅛ inch, and the T12 designation, which correlates to a tube diameter of 1½ inch. Each of these designations include a ballast, which may be an instant start, rapid start or programmed rapid start ballast.

Conventional fluorescent light fixtures suffer from a number of limitations, including high operating voltages, high power consumption, short life expectancy, and/or poor light output quality in terms of both color temperature and color rendering. Based upon these and other limitations, various third-parties have pursued other avenues to improve the operation of conventional fluorescent light fixtures. One alternative is replace the fluorescent lamps of conventional fluorescent light fixtures with LED lighting elements. LEDs by design are more durable, have longer life expectancy, and have superior light quality when measured in terms of color temperature and color rendering as compared to fluorescent lamps. However, the ability to replace fluorescent lamps with LEDs is hindered by operating differences between the two light sources.

Fluorescent lamps are primarily driven by electronic ballasts. These ballasts drive the lamps with alternating current (AC) signals, that are generally characterized by high frequency, high voltage with high peak voltages, and constant current with high peak currents. LED's on the other hand are low voltage direct current (DC) devices. Although they can be arrayed in series to create strings that operate at higher voltages, they still require a DC power supply to illuminate. The LEDs will only illuminate with current passing through them in one direction (DC), and, if driven with an AC power supply used to power fluorescent lamps, will only illuminate approximately half of the time when the AC signal is the correct polarity. These operating differences may require replacement of not only the fluorescent bulb itself, but also some or all of the other components of the fluorescent lighting fixture, resulting in high cost and expenditure of time.

Figure 5:
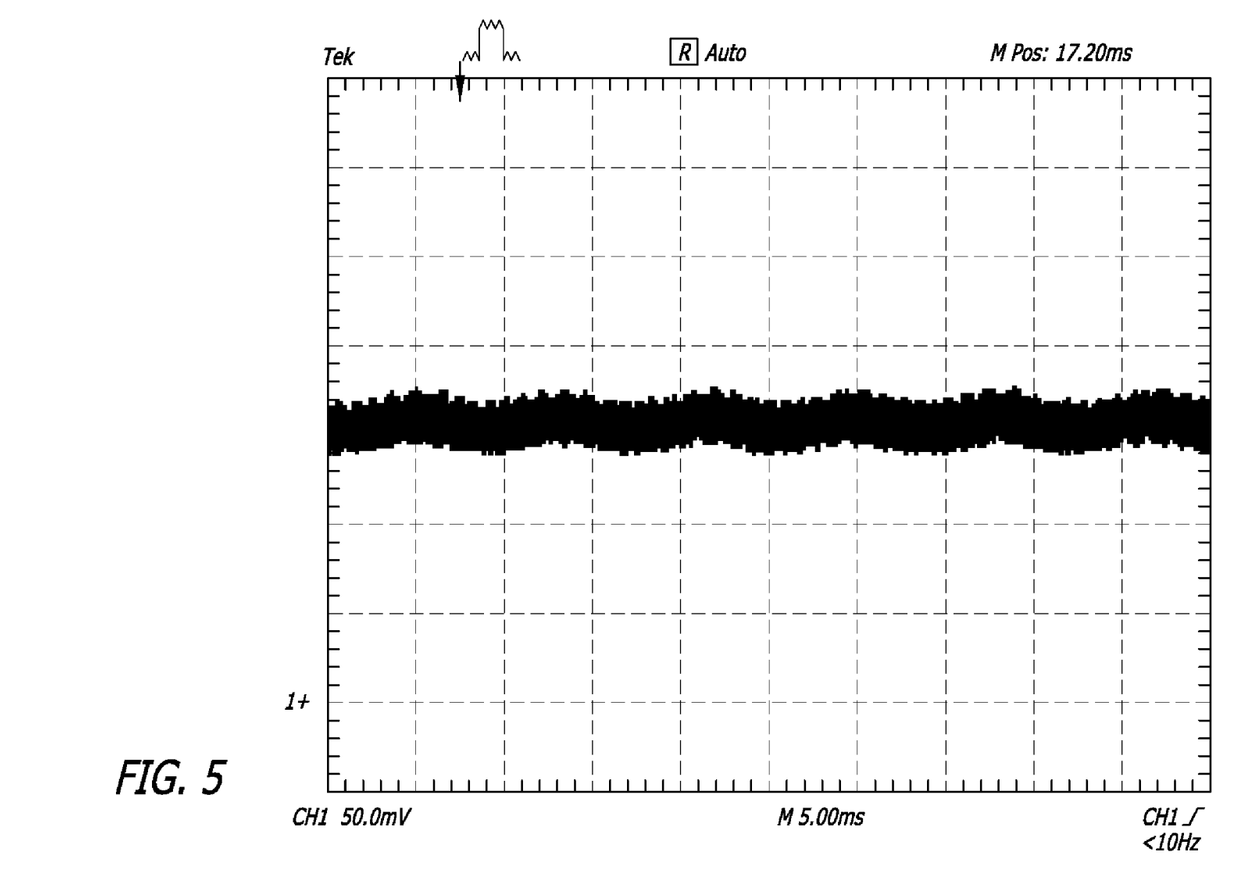
FIG. 5 provides an example of the current output over time of the converter module of the inventive lighting element of FIG. 1.

One avenue pursued by third parties to remedy the above mentioned limitations is shown in U.S. Pat. No. 7,510,299. The patent discloses a replacement fluorescent light tube with LED arrays 22. FIG. 5 shows a first power supply circuit 100 that resides within the tube 20 and comprises an AC power source 46, a conventional ballast 48, a rectifier/filter circuit 50, a pulse width modulation (PWM) circuit 52, a pair current limiting circuits 54 and a pair of LED arrays 22, wherein a single limiting circuit 54 is associated with a single LED array 22. (Col. 3: lns. 36-41).

The '299 patent explains that: "the PWM circuit 52 receives the DC power from the rectifier/filter circuit 50 and cyclically switches the DC power on and off to the one or more current-limiting circuits 54. The DC power is switched on and off by the PWM circuit 52 at a frequency which causes the white light emitted from the LEDs 22 to appear, when viewed with a "naked" human eye, to shine continuously. The PWM duty cycle can be adjusted or varied by control circuitry (not shown) to maintain the power consumption of the LEDs 22 at safe levels." (Col. 3, lns. 47-56). The '299 further explains that the DC power is modulated for a number of reasons: (i) to adjust the brightness or intensity of the light emitted by the LEDs 22, (ii) to improve the illumination efficiency of the light tube 20 by capitalizing upon a phenomenon in which short pulses of light at high brightness or intensity to appear brighter than a continuous, lower brightness or intensity of light having the same average power, (iii) the DC power is modulated to regulate the intensity of light emitted from the light tube 20 to compensate for supply voltage fluctuations, ambient temperature changes, and other such factors which effect the intensity of white light emitted by the LEDs 22; (iv) to raise the variations of the frequency of light above the nominal variation of 120 to 100 Hz thereby reducing illumination artifacts caused by low frequency light variations, including interactions with video screens, and (v), the DC power may optionally be modulated to provide an alarm function wherein light from the light tube 20 cyclically flashes on and off. (Col. 3, lns. 57—Col. 4, lns. 13). To accomplish these functions, the power supply circuit 100 necessitates a number of costly components, including the PWM circuit 52. In addition, the internal control signal for the PWM circuit 52 has only one possible frequency which means there can only be one brightness level. Thus, the power supply circuit 100 taught by the '299 patent suffers from a number of limitations, including but not limited to being costly to manufacture and prone to reliability and operability concerns.

The present invention seeks to overcome certain of these limitations and other drawbacks of the prior art, and to provide new features not heretofore available. A full discussion of the features and advantages of the present invention is deferred to the following detailed description, which proceeds with reference to the accompanying drawings.

SUMMARY OF THE INVENTION

The present invention is directed to a fluorescent light fixture assembly including a ballast and a novel lighting element that includes an array of LEDs and at least one converter module that converts AC current to DC current and enables the existing ballast to supply DC power to the LED array.

According to one aspect of the invention, the lighting element is installed within a preexisting fluorescent fixture, including the existing ballast. The lighting element receives power from the existing ballast, wherein the converter module provides a constant current source to power the LED array. Thus, the lighting element, including the converter module, can replace the conventional fluorescent light tube, and may be utilized in a cost-effective retrofit manner with the existing ballast.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which:

FIG. 1 is a schematic of the inventive lighting element electrically connected to a ballast, the lighting element including opposed converter modules and a LED array positioned there between;

DETAILED DESCRIPTION

While this invention is susceptible of embodiments in many different forms, there are shown in the drawings and will herein be described in detail preferred embodiments of the invention with the understanding that the present disclosure is to be considered as an exemplification of the principles of the invention and is not intended to limit the broad aspect of the invention to the embodiments illustrated.

The present invention is directed to a fluorescent light fixture assembly including a ballast to supply power to conventional fluorescent lamps and a novel lighting element 10 that includes an array of LEDs and at least one converter module that enables the existing ballast to supply power to the LED array. The lighting element includes a body configured to fit within a preexisting fluorescent light fixture. In general terms, the lighting element receives power from the preexisting ballast, wherein the converter module provides a constant current source to power the LED array. Thus, the lighting element, including the converter module, replaces the conventional fluorescent lighting element in a cost-effective retrofit manner with the existing ballast.

Figure 1:
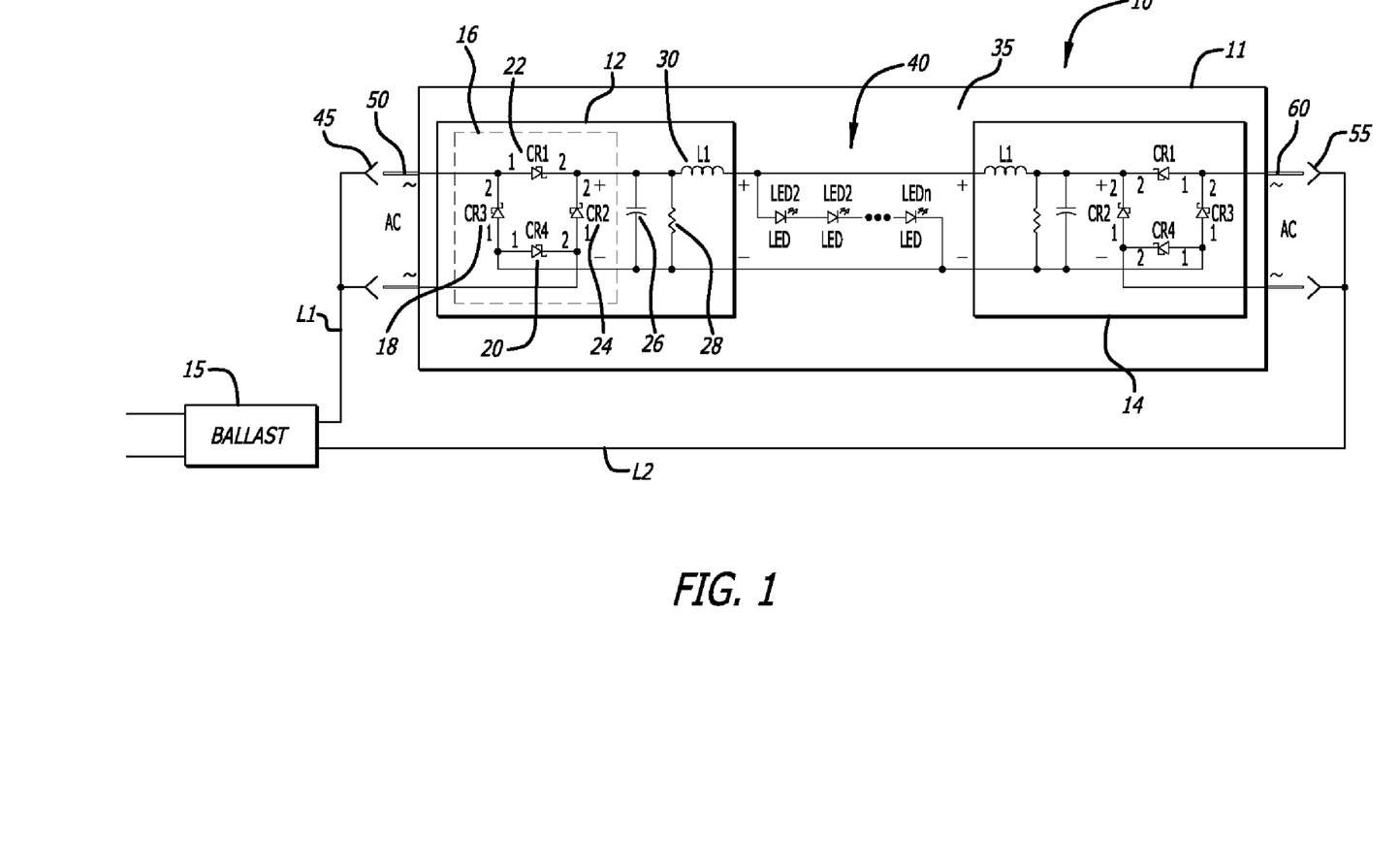

FIG. 1 is a schematic of a lighting element 10 of a first embodiment according to the present design. The lighting element 10 includes a body 11 that contains the LED array 40 and the converter modules 12 and 14. In FIG. 1, the body 11 has an elongated, tubular configuration, which facilitates the retrofit installation of the lighting element 10 within a preexisting fluorescent fixture, including the existing ballast 15. Alternatively, the lighting element 10, including the body 11, can have a cylindrical configuration which allows for installation within a high intensity discharge (HID) fixture. Thus, the lighting element 10 is adaptable to the configuration of the lighting element that is to be retrofitted.

In a first embodiment, the lighting element 10 contains two converter modules 12, 14 positioned at opposite ends of the lighting element 10 between the ballast 15 and the LED array 40. In the current example, the ballast 15 is a conventional ballast used to fire a typical fluorescent light fixture. In the current example, the ballast input is supplied with a 120VAC to 277VAC at 60 Hz, and has an output that supplies the input to converter modules 12, 14 with the same high frequency (40-50 KHz), high voltage (up to 1000 volts) signal that is used to start and operate a fluorescent lamp.

The converter modules 12, 14 each include: a bridge rectifier 16 composed of four diodes 18, 20, 22, 24; a capacitor 26; a resistor 28; and, an inductor 30. The bridge rectifier 16 is an electrical device that converts the alternating current (AC) received from the ballast to direct current (DC), a process known as rectification. Rectifiers may be made of solid state diodes, vacuum tube diodes, mercury arc valves, and other similar components. Preferably, the rectifier 16 is composed of four diodes 18, 20, 22 and 24 that are of the high-voltage and high-speed variety, each with a rating of 1000 volts at 1 amp. The high-voltage, high-speed diodes 18, 20, 22 and 24 allow the rectifier 16 to handle the large voltage spikes that may be received from the ballast 15 when it is attempting to operate, especially at start up, what was previously a fluorescent lighting element that requires a high initial charge to excite the gas contained within the fluorescent element.

The form of the rectifier 16 of the current system is commonly referred to as a full-wave rectifier. A full-wave rectifier converts the whole of the input waveform to one of constant polarity (positive or negative) at its output. Full-wave rectification converts both polarities of the AC input waveform to DC (direct current). When the four high-voltage, high-speed diodes 18, 20, 22 and 24 are arranged in the manner of the current invention, and used for the conversion of an AC input to a DC output, the rectifier 16 is commonly referred to as a diode bridge or a bridge rectifier. A diode bridge or bridge rectifier is an arrangement of four diodes in a bridge configuration that provides the same polarity of output voltage for either polarity of input voltage. The bridge rectifier 16 provides full-wave rectification from a two-wire AC input, resulting in lower cost and weight as compared to a center-tapped transformer design. One benefit of placing the converter modules 12 and 14 at opposite ends of the LED array is that it allows the LED array to utilize both positive and negative phases of the voltage supply. Another may be that, if using a Rapid Start ballast with two wires being input into each end of the lighting element, the LED array may be operated even when there is a voltage differential across the two wires during the start up period.

Where the full-wave bridge rectifier 16 converts an AC input into a DC output, a capacitor 26 may be utilized. The rectifier 16 alone supplies an output of fixed polarity, but with a continuously varying or "pulsating" magnitude, an attribute commonly referred to as "ripple". The capacitor 26 is positioned within the converter module between the bridge rectifier 16 and the LED array 40 such that it receives the output of the bridge rectifier 16. The function of the capacitor 26, known as a filtering capacitor (or smoothing capacitor), is to lessen the variation in (or "smooth") the rectified AC output voltage waveform from the bridge rectifier 16. The capacitor 26 provides a low impedance path to the AC component of the output, reducing the AC voltage (i.e., high frequency noise) across the resistive load. In less technical terms, any drop in the output voltage and current of the bridge rectifier 16 tends to be canceled by loss of charge in the capacitor 26. This charge flows out as additional current through the load. Thus, the change of load current and voltage is reduced relative to what would occur without the capacitor 26. Increases of voltage correspondingly store excess charge in the capacitor 26, thus moderating the change in output voltage/current. In the present invention, the capacitor 26 is preferably rated to 1000 volts, but has a very low capacitance of only 0.1 microFarads. This low capacitance value is preferred as the capacitor 26 is used to filter the high frequency voltage supplied from the ballast 15. Bulk energy storage provided by a larger capacitor is not required with the converter modules 12, 14, thus the lower value capacitor 26 is employed. Also, utilizing a low capacitance value 26 helps reduce material costs and keeps the form factor smaller than is currently used by other similar products. To increase reliability of the converter modules 12, 14, a ceramic capacitor 26 can be utilized in lieu of an electrolytic type.

Next, a resistor 28 in parallel with the capacitor 26 is added to further enhance the smoothing of the AC output received from the ballast 15. The resistor 28 is also positioned between the rectifier 16 and the LED array 40. In the present example, the resistor 28 preferably has a value of 1 mega-Ohms. The resistor 28 provides a small load to the ballast to facilitate operation of the light element 10 and/or bleeding of any excess voltage stored within the capacitor 26 upon shutdown of the light element 10. Because the capacitor 26 and resistor 28 are in parallel to each other, this arrangement differs from an RC filter that requires the capacitor and resistor to be in series.

To further reduce the current ripple, the converter modules 12, 14 each include an inductor 30, preferably having ratings of 330 microHenri and 400 mAmps. The inductor is positioned in series with the positive DC output connection of the module, as well as the positive DC output connection of the bridge rectifier. In the circuit of the present example shown in FIG. 1, the capacitor 26 stores a small amount of energy, and attempts to maintain a constant output voltage between input peaks from the rectifier. The inductor 30 stores energy in its magnetic field, and releases energy as needed in its attempt to maintain a constant current through itself. As a result, the combination of the capacitor 26 and the inductor 30 smoothes out the voltage and current source to allow for a more constant DC power source for the LED array 40.

The inductor 30 and capacitor 26 are used together to form a Low Pass LC Filter which is cost effective, small in size, and reliable. By using a second active component, inductor 30, in conjunction with the capacitor 26, the capacitor 26 may be sized very small both physically and in capacitance value (0.1 uF). At this low value, a ceramic type capacitor can be used even if rated at the preferred 1,000 volts. The ceramic capacitor has much better long term reliability than the electrolytic capacitor types that would be required for a single capacitor type filter requiring larger values of capacitance. Further these two components can easily be embedded within the dimensional constraints of a traditional T8 Fluorescent Tube. Without the inductor 30, a larger valued single capacitor may be able to perform a similar filtering function, but may require increased physical size.

Referring to FIG. 1, in the current embodiment a first lead L1 supplies a waveform (~) through a first set of female connectors 45 to a first set of male pins 50 of the lighting element 10. A second lead L2 supplies a waveform (~) with opposite polarity through a second set of female connectors 55 to a second set of male pins 60 of the lighting element 10. It should be understood that leads L1 and L2 may actually be comprised of two wires each depending upon the type of ballast being used. The type of male and female connectors 45, 55 varies with the fixture type. For example, T5 bases can include a miniature bi-pin (G5), 4-pin (G10q), or single pin (Fa8); T8 base can include a medium bi-pin (G13), medium bi-pin (G23), recessed double contact (R17d), or single pin (Fa8); and, T12 base can include a medium bi-pin (G13), recessed double contact (R17d), or single pin (Fa8).

Figure 2:
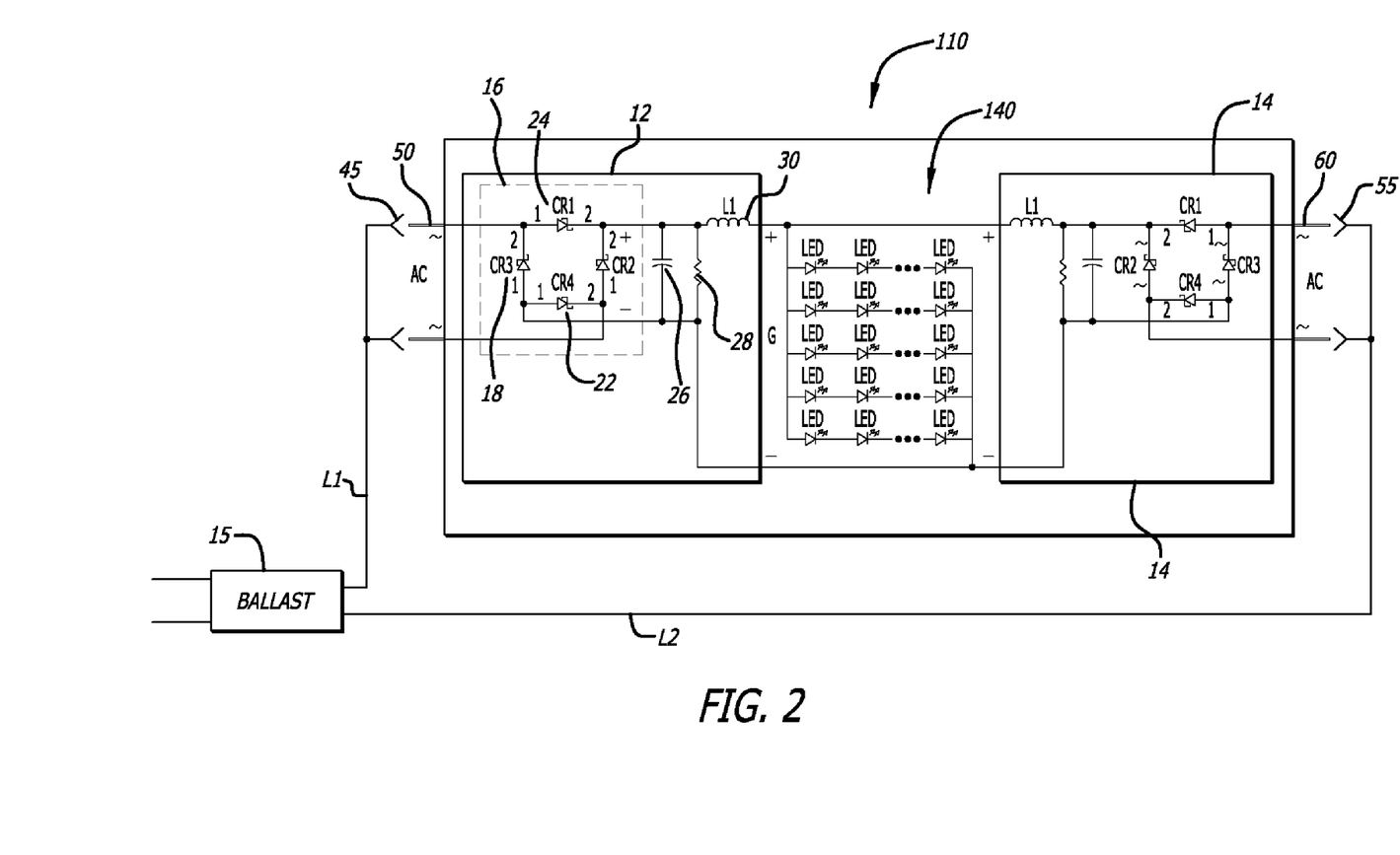
FIG. 2 is a schematic of a second inventive lighting element electrically connected to a ballast, the lighting element including opposed converter modules and a LED array positioned there between, the LED array comprising multiple parallel groups of LEDs in serial arrangement within each group.

The LED array 40 comprises a plurality of low-power LEDs having a rating of 0.1-3.0 Watts, which are serially arranged and mounted on a printed circuit board 35 (e.g. FR4 laminate board or flexible board), preferably between the converter modules 12, 14. Although in series in the current embodiment, it should be understood that other orientations are possible. For example, FIG. 2 is a schematic of an alternate lighting element which also utilizes converter modules 12, 14. The alternate lighting element 110 as shown in FIG. 2 has a body 111 which includes an LED array 140 which comprises distinct parallel groups G of LEDs residing between the converter modules 12, 14, wherein the LEDs are serially arranged in each group G.

As shown by FIGS. 1 and 2, the LED array may be arranged in a variety of configurations. The LED arrays 40 and 140 may include a variety of configurations, including that the LEDs may be arranged in a single plane or multiple planes. In the latter arrangement, a first plane of LEDs is angularly oriented from a second plane of LEDs. The orientation angle will vary with the configuration of the lighting element 10. For example, the first plane of LEDs may be opposed to the second plane of LEDs whereby the angular orientation is substantially 180 degrees. In another example, there are four distinct planes of LEDs that are arranged substantially 90 degrees apart. During operation, the LED array 40 or 140 is powered by both converter modules 12, 14 which utilize both half-cycles of the ballast's AC supply. For example, the first converter module 12 supplies smoothed power during the first half cycle while the second converter module 14 supplies smoothed power during the second half cycle.

Figure 3:
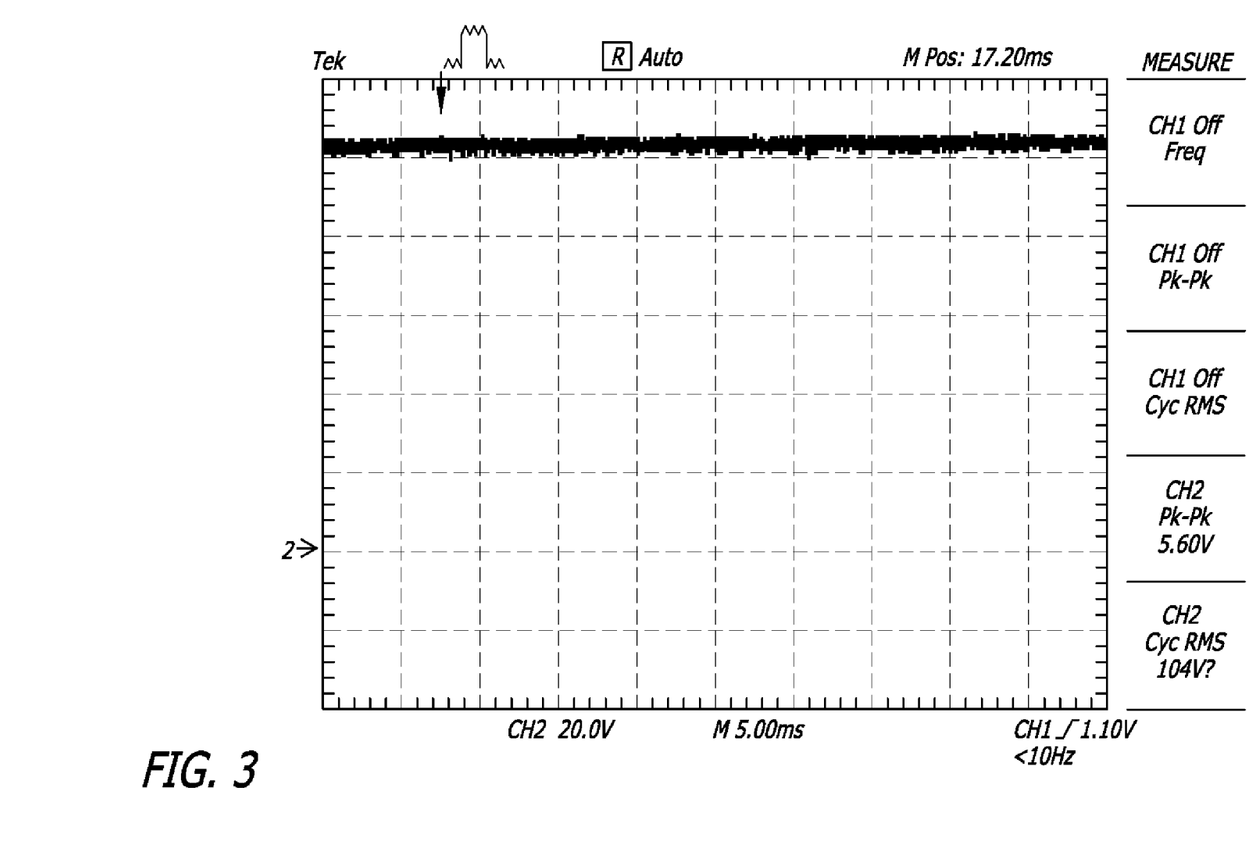
FIG. 3 provides an example of the voltage output over time of the converter module of the inventive lighting element of FIG. 1.
Figure 4:
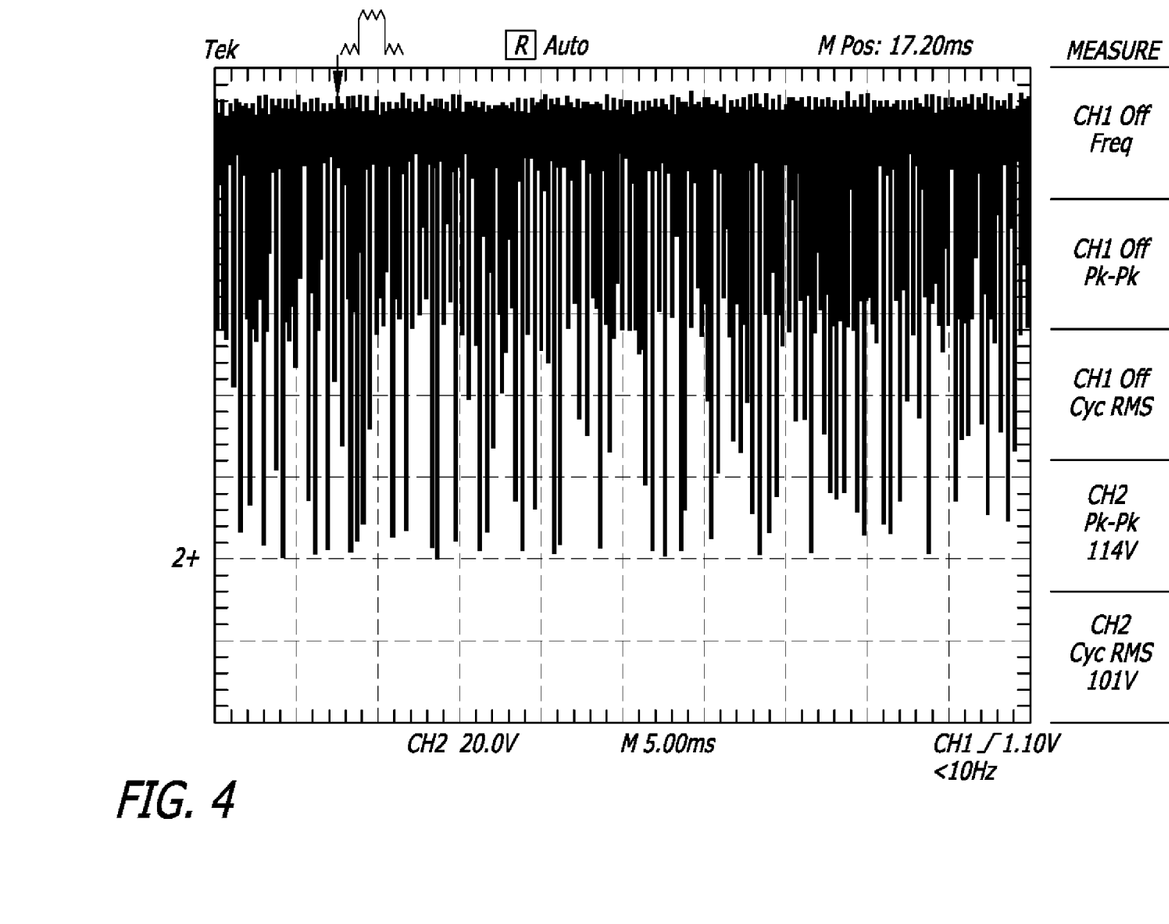
FIG. 4 provides an example of the voltage output over time of the converter module of the inventive lighting element of FIG. 1 when the capacitor is removed.

FIG. 3 shows an example of the voltage output over time of the converter module 12 when used in the orientation shown in FIG. 1. FIG. 3 shows the output of the converter module of FIG. 1 when the converter module 12 includes a capacitor 26, resistor 28, and the inductor 30 of the preferred values. The voltage output over time is measured across the + and − outputs of the converter module 12 when the circuit is configured using all parameters provided. Alternatively, FIG. 4 shows the voltage output over time of the same circuit but with capacitor 26 removed from the converter module. As shown, by comparing FIGS. 3 and 4, the smoothing provided by capacitor significantly reduces the variations in magnitude of the voltage output of the converter module which is then provided to the LED array. As shown in FIG. 4, signal noise due to high frequency switching from the output of the ballast is present, and reflects the omission of the capacitor.

Figure 6:
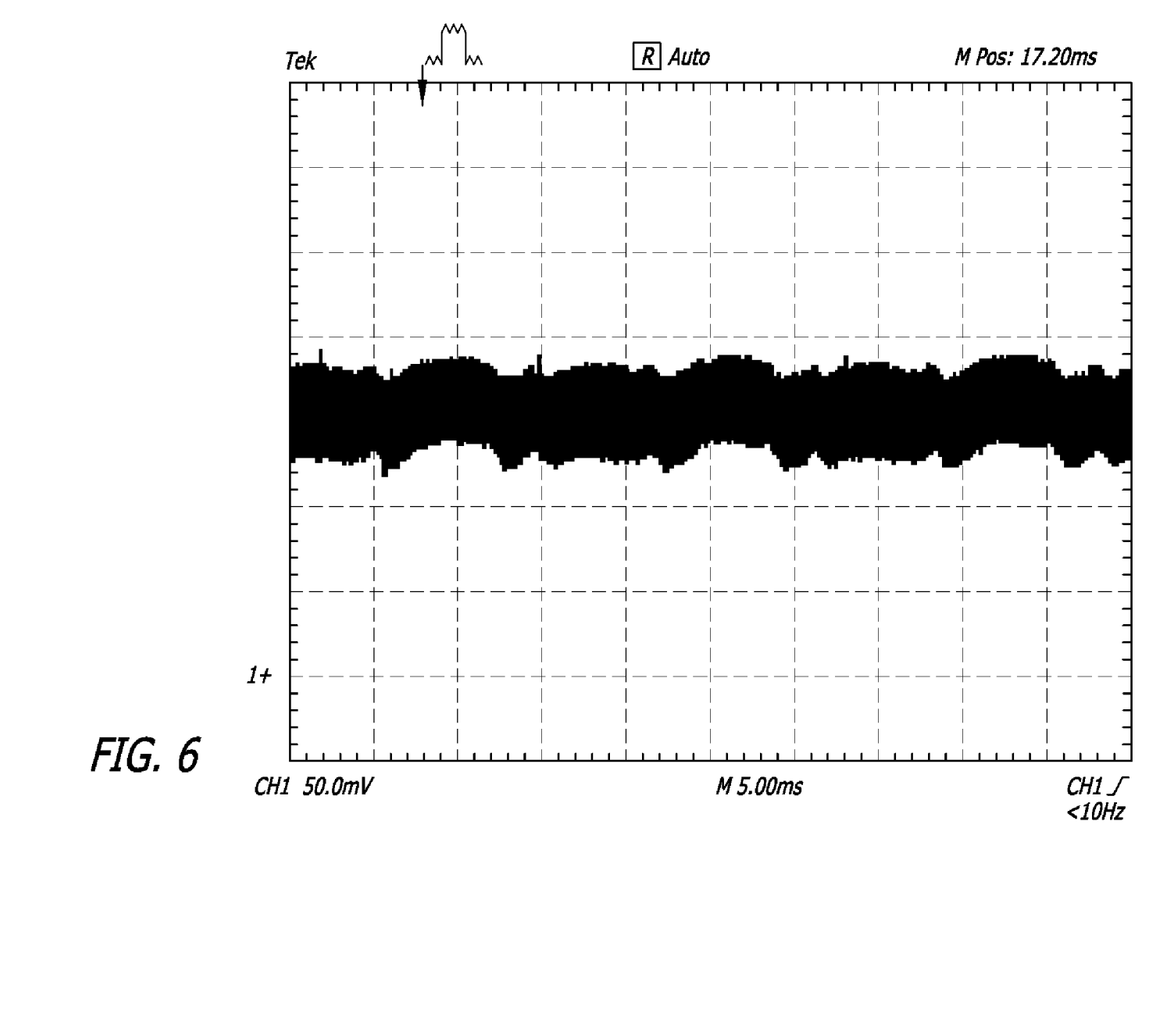
FIG. 6 provides an example of the current output over time of the converter module of the inventive lighting element of FIG. 1 when the inductor is removed; and, FIG. 7 provides a schematic of an third embodiment of the inventive lighting element electrically connected to a ballast, showing an alternate converter module.

To look at the example in another way. FIGS. 5 and 6 show examples of the current output over time of the converter module 12 when used in the same orientation shown in FIG.

1. The same parameters as described in relation to FIGS. 3 and 4 are employed. FIG. 5 is the current output of the converter module 12 when in the lighting element of FIG. 1 measured at the + output wire of the converter module 12 when the inductor 30 is included while FIG. 4 shows an example of the current output of that same converter module 12 without the inductor 30. As shown by comparison of FIGS. 5 and 6, the addition of the inductor significantly reduces variations in the current supplied to the LED array 40, allowing for a more constant DC current.

The differences observed when comparing FIGS. 3 and 4 and FIGS. 5 and 6 demonstrate the effectiveness of the converter module 12 in converting the AC output from an existing ballast 15 into a DC input that may be utilized by the LED array 40.

Figure 7:
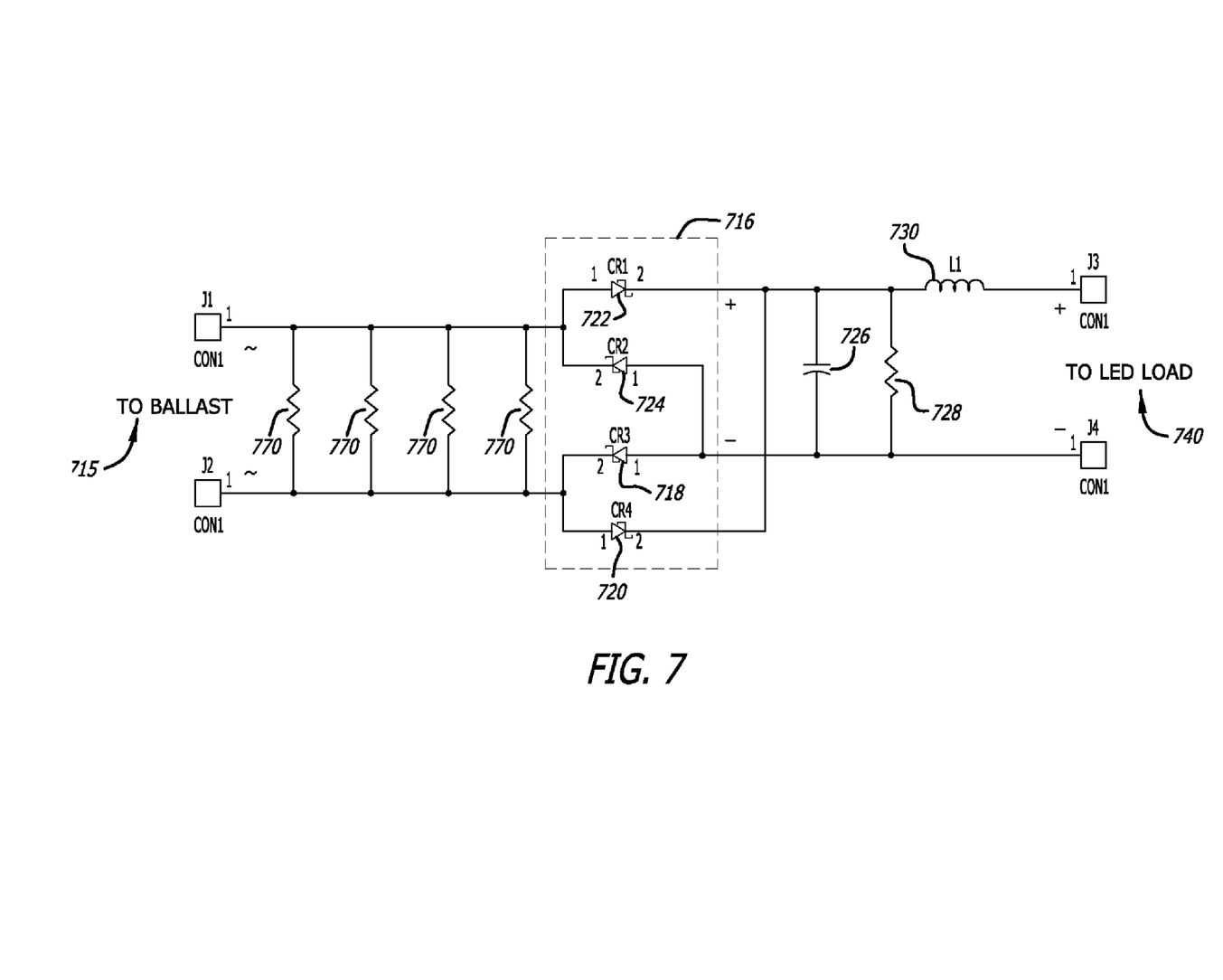

FIG. 7 shows an alternate converter module 712 for use within a lighting element 710 of the present invention. While only a single converter module 712 is shown in FIG. 7, it is understood that two converter modules 712 can be employed within the lighting element 710 in the manner shown in FIGS. 1 and 2. The converter module 712 is positioned between the ballast and the LED load 740 and includes: a bridge rectifier 716 composed of four diodes 718, 720, 722, 724; a capacitor 726; a resistor 728; and, an inductor 730. Each diode 718, 720, 722, 724, capacitor 726, resistor 728, and inductor 730 preferably has a value similar to that of diodes 18, 20, 22, 24, capacitor 26, resistor 28, and inductor 30, respectively.

In addition, at least one resistor 770 is positioned between the ballast 715 and the bridge rectifier 716. Ballast 715 operates under conditions similar to those of Ballast 15. Preferably, a plurality of resistors 770 in parallel are between the ballast 715 and the bridge rectifier 716. Most preferably, four parallel resistors 770 having a rating of 200 Ohms and 0.25 Watt, which provides a total resistance of 50 Ohms, are utilized. During operation of the lighting element 710, the resistors 770 simulate a load on the ballast 715, for example rapid start or programmed rapid start ballasts, such that the ballast 715 functions properly. Because the lighting element 710 replaces the conventional fluorescent lighting element, the resistors 770 collectively provide a simulation resistance and/or impedance that mimics the fluorescent lighting element's resistance and/or impedance, which is monitored by the ballast 715. Modern ballasts are typically designed with light source identification capabilities which allows them to monitor resistance and/or impedance to determine the type of fluorescent lighting element employed in the fixture. Due to the simulation resistance and/or impedance, the ballast 715 assumes the presence of the conventional fluorescent lighting element and supplies current to the converter module 712 that allows for proper operation of the LED array 740.

While the specific embodiments have been illustrated and described, numerous modifications come to mind without significantly departing from the spirit of the invention, and the scope of protection is only limited by the scope of the accompanying Claims.

What is claimed is:

1. A fluorescent light fixture assembly comprising:
    a rapid start ballast configured to power a fluorescent lighting element;
    at least one LED lighting element having at least one LED array, and a first converter module and a second converter module positioned on opposite ends of the at least one LED array and between the ballast and the at least one LED array,
    wherein the first converter module is electrically connected to the ballast and is electrically connected in series to one end of the at least one LED array, and the second converter module is electrically connected in series to the ballast and is electrically connected in series to an opposite end of the at least one LED array, and wherein each of the first and second converter modules receives an AC power input from the ballast and converts the AC power input to a DC power output through rectification to power the at least one LED array, thereby allowing the LED lighting element to utilize both half cycles of an AC power supply, and wherein the first converter module comprises a first bridge rectifier and the second converter module comprises a second bridge rectifier; and
    wherein a plurality of resistors in parallel are positioned between the ballast and the rectifiers.

2. The fluorescent light fixture assembly of claim 1, wherein each of the first and second bridge rectifiers is composed of four diodes in a bridge configuration.

3. The fluorescent light fixture assembly of claim 2, wherein the diodes are high-voltage, high-speed diodes.

4. The fluorescent light fixture assembly of claim 2, wherein each of the first and second converter modules further comprises at least one resistor positioned between the ballast and the associated bridge rectifier.

5. The fluorescent light fixture assembly of claim 2, wherein each of the first and second converter modules further comprises a capacitor positioned between the associated bridge rectifier and the at least one LED array.

6. The fluorescent light fixture assembly of claim 5, wherein each of the first and second converter modules further comprises a resistor.

7. The fluorescent light fixture assembly of claim 6, wherein in each of the first and second converter modules the associated resistor and associated capacitor are parallel to each other, the associated resistor and associated capacitor both positioned between the associated rectifier and the at least one LED array.

8. The fluorescent light fixture assembly of claim 7, wherein each of the first and second converter modules further comprises an inductor.

9. A replacement LED lighting element installed to a pre-existing ballast of a fluorescent light fixture assembly, the LED light element comprising:
    at least one LED array; and
    a first converter module and a second converter module positioned on opposite ends of the at least one LED array and between the ballast and the at least one LED array,
    wherein the first converter module is electrically connected to the ballast and is electrically connected in series to one end of the at least one LED array, and the second converter module is electrically connected to the ballast and is electrically connected in series to an opposite end of the at least one LED array, and wherein each of the first and second converter module modules receives an AC power input from the ballast and converts the AC power input to a DC power output through rectification to power the at least one LED array, thereby allowing the LED lighting element to utilize both half cycles of an AC power supply, and wherein the first converter module comprises a first bridge rectifier and the second converter module comprises a second bridge rectifier-and rectifier; and
    wherein a plurality of resistors in parallel are positioned between the ballast and the rectifiers.

10. The LED lighting element of claim 9, wherein each of the first and second bridge rectifiers is composed of four diodes in a bridge configuration.

11. The LED lighting element of claim 10, wherein the diodes are high-voltage, high-speed diodes.

12. The LED lighting element of claim 10, wherein each of the first and second converter modules further comprises at least one resistor positioned between the ballast and the associated bridge rectifier.

13. The LED lighting element of claim 9, wherein each of the first and second converter modules comprises a plurality of resistors in parallel positioned between the ballast and the associated bridge rectifier, and wherein the plurality of resistors consists of four parallel resistors having a rating of 200 Ohms and 0.25 Watt, which provides a total resistance of 50 Ohms.

14. The LED lighting element of claim 10, wherein each of the first and second converter modules further comprises a capacitor positioned between the associated bridge rectifier and the at least one LED array.

15. The LED lighting element of claim 14, wherein each of the first and second converter modules further comprises a resistor parallel to the associated capacitor, the resistor positioned between the associated bridge rectifier and the at least one LED array.

16. The LED lighting element of claim 15, wherein each of the first and second converter modules further comprises an inductor.

17. The LED lighting element of claim 14 wherein the capacitor has a capacitance of 0.1 uF.

18. The LED lighting element of claim 14, wherein each of the first and second converter modules receives a two-wire AC input and the associated bridge rectifier is a full wave rectifier.

19. The LED lighting element of claim 14, wherein each of the first and second converter modules further comprises a resistor.

20. The LED lighting element of claim 19, wherein the resistor has a resistance of 1 mega-ohms.

21. The LED lighting element of claim 19, wherein in each of the first and second converter modules the capacitor and the resistor are in parallel with each other, the capacitor and resistor both positioned between the bridge rectifier and the at least one LED array.

22. The LED lighting element of claim 16, wherein the inductor as an inductance of 330 mH.

* * * * *